United States Patent
Uetani et al.

(10) Patent No.: US 6,818,862 B2
(45) Date of Patent: Nov. 16, 2004

(54) IRON TIP AND ELECTRIC SOLDERING IRON

(75) Inventors: Takashi Uetani, Osaka (JP); Mitsuhiko Miyazaki, Osaka (JP)

(73) Assignee: Hakko Corporation, Osaka (JP)

(*) Notice: Subject to any disclaimer, the term of this patent is extended or adjusted under 35 U.S.C. 154(b) by 0 days.

(21) Appl. No.: 10/264,718

(22) Filed: Oct. 4, 2002

(65) Prior Publication Data

US 2004/0065653 A1 Apr. 8, 2004

(51) Int. Cl.$^7$ .............................................. B23K 3/00
(52) U.S. Cl. ............................................ 219/229; 228/54
(58) Field of Search .................... 219/229, 230, 219/238–239; 228/54, 51

(56) References Cited

U.S. PATENT DOCUMENTS

| | | | | |
|---|---|---|---|---|
| 1,221,566 A | * | 4/1917 | Moench | 428/658 |
| 3,125,055 A | * | 3/1964 | Lerner | 228/54 |
| 4,500,027 A | * | 2/1985 | Nakajima | 228/54 |
| 4,974,768 A | * | 12/1990 | Ebata | 228/54 |

FOREIGN PATENT DOCUMENTS

| | | | |
|---|---|---|---|
| FR | 2068861 | * | 9/1971 |
| JP | 37-021531 U | | 8/1962 |
| JP | 54-104439 U | | 7/1979 |
| JP | 61-042481 | | 2/1986 |
| JP | 1-172452 U | | 12/1989 |
| JP | 2-55665 | * | 2/1990 |
| WO | 02/10477 | * | 2/2002 |

* cited by examiner

*Primary Examiner*—John A. Jeffrey
(74) *Attorney, Agent, or Firm*—Squire, Sanders & Dempsey, LLP

(57) ABSTRACT

In an iron tip for a soldering iron, composed of Fe plated copper or copper alloy, an outer surface excluding a solder coating portion in a leading end portion of the iron tip is plated with Cu in a film thickness range of approximately 10 to 50 $\mu$m, the surface is coated with a mixture of Al particles and flux, only the Al particles are melted in an inert gas atmosphere, and the surface is modified into a surface with a Cu—Al alloy coated layer having a high Al concentration. As a result, without using Cr plating, it is possible to provide an electric soldering iron having an excellent resistance to oxidation under high temperature environment and a high heat conductivity.

32 Claims, 11 Drawing Sheets

PRIOR ART

| | UNTREATED | SURFACE MODIFIED |
|---|---|---|
| 0 | 0 | 0 |
| 300 | 0.02 | 0.01 |
| 400 | 0.47 | 0.005 |
| 500 | 1.18 | 0.03 |
| 600 | 1.95 | 0.03 |

OXIDE INCREMENT IN UNTREATED COPPER PLATE
AND SURFACE MODIFIED COPPER PLATE

| | UNTREATED | SURFACE MODIFIED |
|---|---|---|
| 0 | 0 | 0 |
| 300 | 0 | 0.2 |
| 400 | 10.3 | 0.5 |
| 500 | 32 | 1.5 |
| 600 | 48.2 | 1.6 |

OXIDE INCREMENT IN IRON TIP

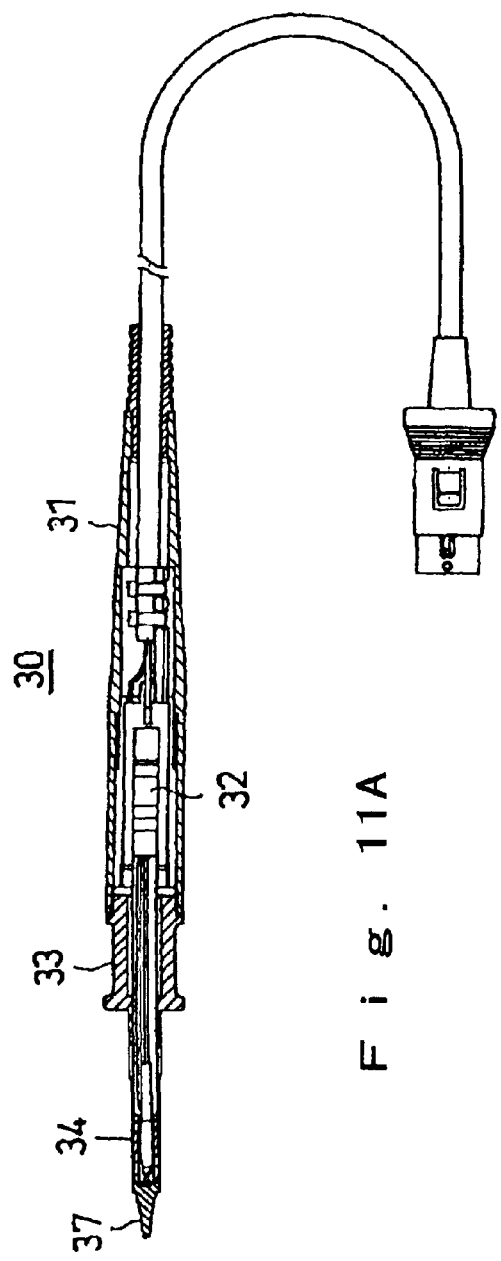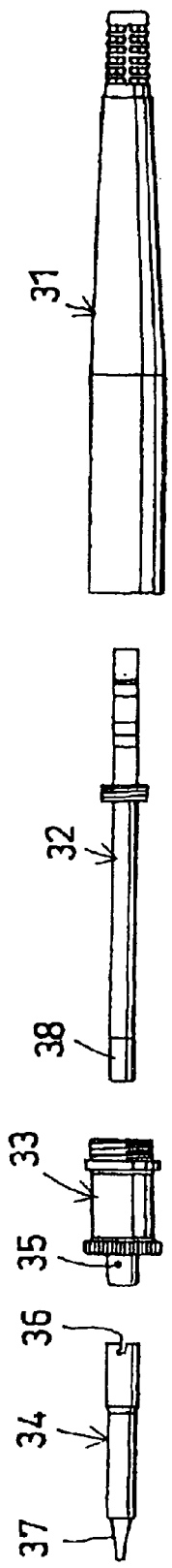
Fig. 11A
Fig. 11B

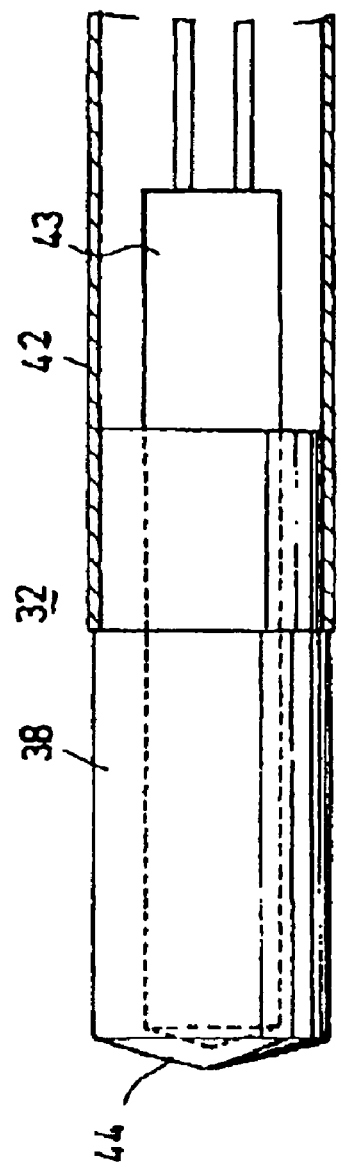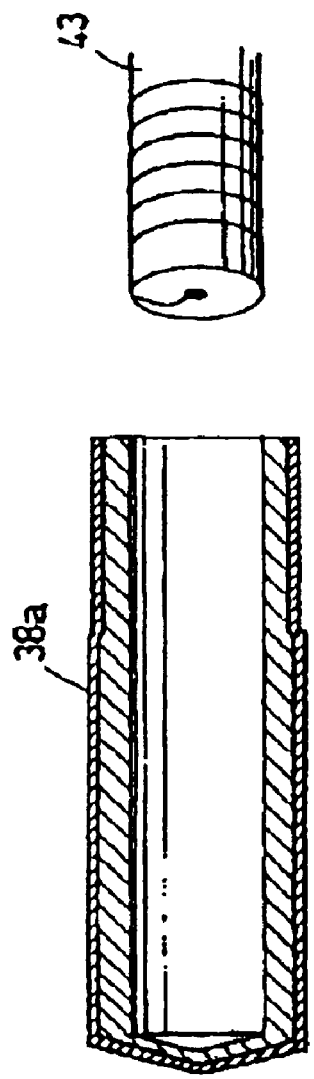
Fig. 13A
Fig. 13B

IRON TIP AND ELECTRIC SOLDERING IRON

FIELD OF THE INVENTION

The present invention relates to an iron tip of an electric soldering iron, and more particularly to an iron tip for an electric soldering iron, having a base material surface modified into a surface of Cu—Al alloy of high Al concentration in order to have resistance to oxidation under high temperature environment, and a soldering iron.

DESCRIPTION OF RELATED ART

Soldering is a general method for connection and bonding in electronic and other industries. Soldering is roughly classified into mass soldering (batch soldering) and manual soldering.

Mass soldering includes a flow soldering method of mounting elements and components on a printed circuit board, and then immersing the board in a molten solder bath, and a reflow soldering method (SMT) of kneading solder particles and flux with a binder, printing the mixed solder paste on the junction area of the printed circuit board, and then mounting components. Both of the methods have the following feature: it is possible to simultaneously solder multiple points.

On the other hand, manual soldering is mainly performed by using a soldering iron, and multiple points cannot be soldered simultaneously. However, the manual soldering is a traditional method and has the following feature: anybody can perform it easily. Besides, for repair of defective joints of mass soldering, the soldering iron method is indispensable. Recently, in particular, use of Pb-free solder is increasing in the face of pollution problems, and defective joints are increasing due to poor soldering performance as compared with the conventional Sn—Pb solder, and correction by soldering iron is becoming more and more important, and the soldering iron is playing a more important role than ever.

A conventional electric soldering iron device will be described. FIG. 1 is an exploded perspective view of a main part at a leading end side of a conventional electric soldering iron. As shown in the figure, a ceramic heater 5 is inserted into a hollow space (a shell 8 in FIG. 3) opened at a base end side formed in an iron tip 3, a protective pipe 2 is fitted on the iron tip 3, and then a cap nut 1 fitted in the protective pipe 2 has been tightened into a nipple 6. At this time, a stainless steel insert pipe 4 having the same length as the ceramic heater 5 is fitted into the hollow space of the iron tip 3. It is thus assembled as shown in FIG. 2 and put in use. In this structure, when the iron tip 3 is worn in a long period of use, it can be easily replaced with a new tip.

A sectional view of a conventional iron tip 3 is shown in FIG. 3. The material of the iron tip is required to transfer the heat of the ceramic heater 5 instantly to the tip leading end portion 3a, and hence pure copper of excellent heat conduction or highly heat conductive copper alloy is used.

The surface of the copper-made iron tip 3 is coated with Fe plating 7 of tens of microns in thickness, and further in other areas than the leading end portion 3a, Cr plating 10 of several microns in thickness is applied. The leading end portion 3a is coated with a solder alloy 9, and soldering is done here. At this time, the Fe plating 7 is intended to suppress excessive solder attack of the pure copper or copper alloy material, and the Cr plating 10 is intended to protect the surface from corrosion after Fe plating and prevent oxidation at a high temperature.

On the other hand, in a rear end portion 3b at the opposite side of the leading end portion 3a, a cylindrical shell 8 incorporating a bar-shaped ceramic heater 5 is formed, and it can be freely detached from the heater 5. In the shell 8, further, a stainless steel insert pipe 4 is fitted along the inside, and it protects the ceramic heater 5 from contact with oxide scale formed inside.

However, the conventional structure involved many problems as listed below, and it has been desired to improve them.

First, the Cr plating 10 applied on the outermost layer of the iron tip 3 contains hexavalent chromium in its plating solution, discharge of its wastewater is controlled by the pollution control law, and it is demanded to convert to other plating not using Cr, or other surface treatment than plating.

Structurally, when the iron tip 3 is fitted into the ceramic heater 5 and heated, the inside of the shell of the iron tip 3 is considerably oxidized by the presence of an air layer, and oxide scales of CuO or $Cu_2O$ are formed, and heat conduction is impaired and short circuit or other troubles are caused.

Moreover, since the iron tip 3 can be freely detached, a narrow gap is formed between the inside of the insert pipe 4 and the periphery of the ceramic heater 5, and temperature control with high precision is difficult due to temperature difference caused by it. As its countermeasure, as mentioned above, the thin stainless steel insert pipe 4 is placed between the shell 8 of the iron tip 3 and the ceramic heater 5, but considerable oxidation of the base material copper cannot be avoided, and the stainless steel pipe is poor in heat conductivity and shields the heat conduction, and the response of the temperature sensor is lowered.

SUMMARY OF THE INVENTION

In order to solve the problems, an iron tip for an electric soldering iron, composed of copper or copper alloy, wherein a part or all of an outer surface excluding a leading end portion of the iron tip is modified into a surface with a Cu—Al alloy coating layer.

An electric soldering iron comprising an iron tip composed of copper or copper alloy, wherein a part or all of an outer surface excluding a leading end portion of the iron tip is modified into a surface with a Cu—Al alloy coating layer.

Here, in the iron tip for a soldering iron, a Cu—Al alloy coating layer having a high Al concentration is formed on a surface, and a rigid film of aluminum oxide $Al_2O_3$ is formed, thereby providing resistance to oxidation at high temperature.

BRIEF DESCRIPTION OF THE DRAWINGS

FIGS. 11A and 11B illustrate a soldering iron according to a fourth embodiment.

FIGS. 13A and 13B specifically illustrate a heating member and a second member of the iron tip in FIG. 11;

DETAILED DESCRIPTION OF THE INVENTION

In the present invention, a mixture of Al particles and flux is kneaded with a binder, and the paste is uniformly applied on the surface of the copper-made iron tip 3. By heating the iron tip surface in an inert gas atmosphere after drying, only Al particles are melted, and the surface is modified into a surface of high Al concentration.

At this time, particle size and oxygen content of Al particles have effects on the properties of the coating layer, and particle size of 150 $\mu$m or less is preferred, and oxygen content of particles is preferred to be 1% by weight or less. In the following description, the composition is expressed by % by weight, and it is indicated only % by weight.

As the flux, a halogen compound mainly composed of fluoride is used. A mixture of 80% Al particles and 20% flux is kneaded with a binder, and 2 to 5 mg/cm is applied to the iron tip, and heated in nitrogen gas atmosphere at 700° C., and Al particles are melted. A Cu—Al system alloy is melted at 548° C. by eutectic reaction, but in order to react Al and Cu sufficiently, the heating temperature is raised over 660° C. of melting point of Al, and the iron tip is taken out of the furnace and cooled naturally.

The surface of the iron tip is thus modified into a surface with a coating layer of Cu—Al alloy of high Al concentration, and a beautiful golden surface is obtained. The iron tip 3 thus modified on the surface is installed in a device shown in FIG. 1 and FIG. 2, and after soldering actually by heating to 250 to 400° C., formation of oxide scale was not observed.

Figure 4:
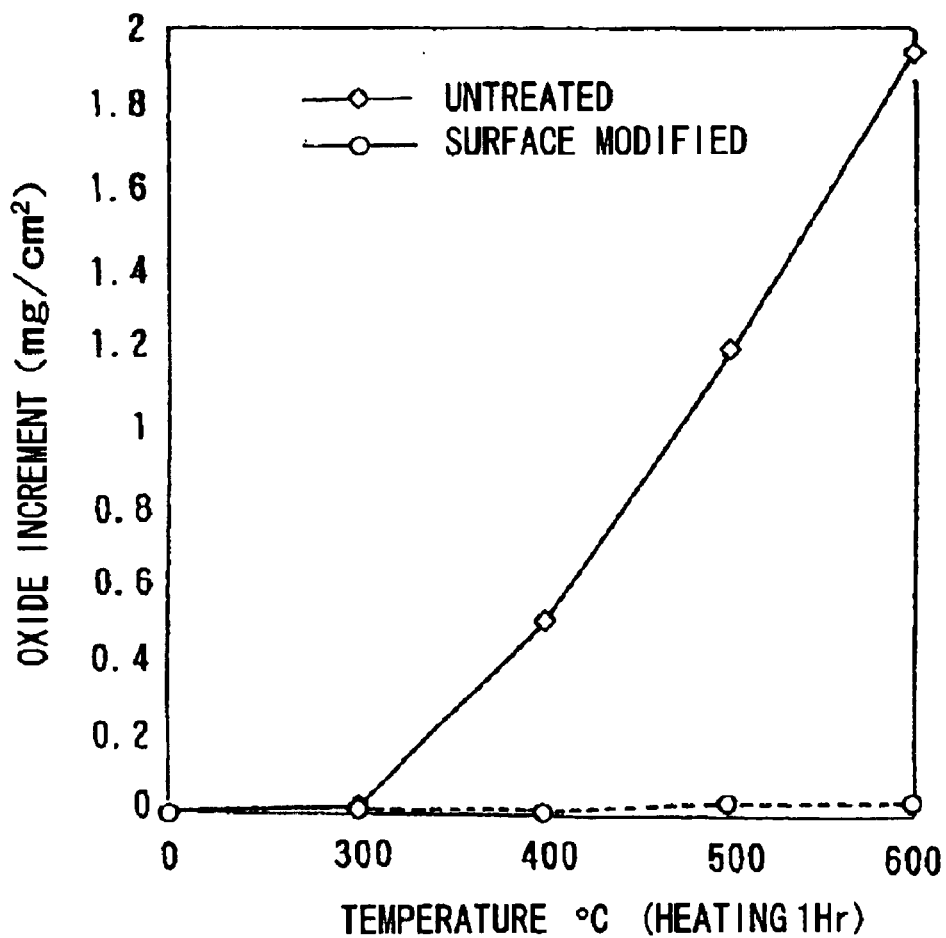
FIG. 4 is a graph showing comparison of oxidation amount between a surface modified copper plate and an untreated copper plate after heating for 1 hr to 600° C. in the atmosphere.

FIG. 4 shows results of fundamental experiment of surface modification, which is a graph showing results of measurement of oxidation increment of pure copper plate (deoxidized copper phosphate plate: DCuP) measuring 25×40×0.5 mm thick and the surface modified plate after heating for 1 hr at 300 to 600° C. in the atmosphere. The pure copper plate is suddenly oxidized at a temperature exceeding 300° C. and increases in oxidation, but the surface modified copper plate is not oxidized at all up to 600° C., and an excellent resistance to oxidation is obtained.

As a result of analysis by EPMA and others in order to find out the cause, it is found that Al is contained by 8 to 15% in the composition of surface modifying layer, and aluminum oxide ($Al_2O_3$) is formed on the electrode surface, which contributes greatly to improvement of resistance to oxidation. At this time, the thickness of the modifying layer can be freely adjusted by the coating amount of the Al particles, and the oxidation resistance effect is sufficient in a range of 20 to 100 $\mu$m in thickness. Flux residue after surface modification is not corrosive, and washing in water or other treatment is not necessary and no environmental pollution is caused, and in this respect it is more advantageous as cared with the conventional plating method.

According to the present invention, by modifying the surface of the copper-made iron tip and the inside of the shell to a Cu—Al alloy composition of high Al concentration, an extremely stable aluminum oxide ($Al_2O_3$) is formed on the surface, and resistance to oxidation is provided in the high temperature environment of the atmosphere.

The thickness of the surface modifying layer is tens of microns, and the excellent electric and thermal conductive properties of copper and copper alloy of the base material are hardly spoiled. Therefore, the surface modification of the present invention is expected to bring about the following effects:

(1) Oxidation resistance is very much improved, and if heated for 1 hr in the atmosphere at 700° C., oxide scale is not formed at all. Therefore, since the usual operating temperature of the soldering iron is 400° C. or less, it can be sufficiently used for coating iron tip.

(2) Hitherto, a stainless steel insert pipe was fitted into the insertion portion of the bar-shaped heater for heating the iron tip owing to the reason described above, and it has adverse effects on heat conductivity, temperature control and its precision of the iron tip, but the structure not requiring the insert pipe is expected to improve the performance substantially.

(3) Because of the excellent oxidation resistance, the conventional Cr plated product can be replaced, and it is expected to solve a part of the environmental problems.

Figure 1:
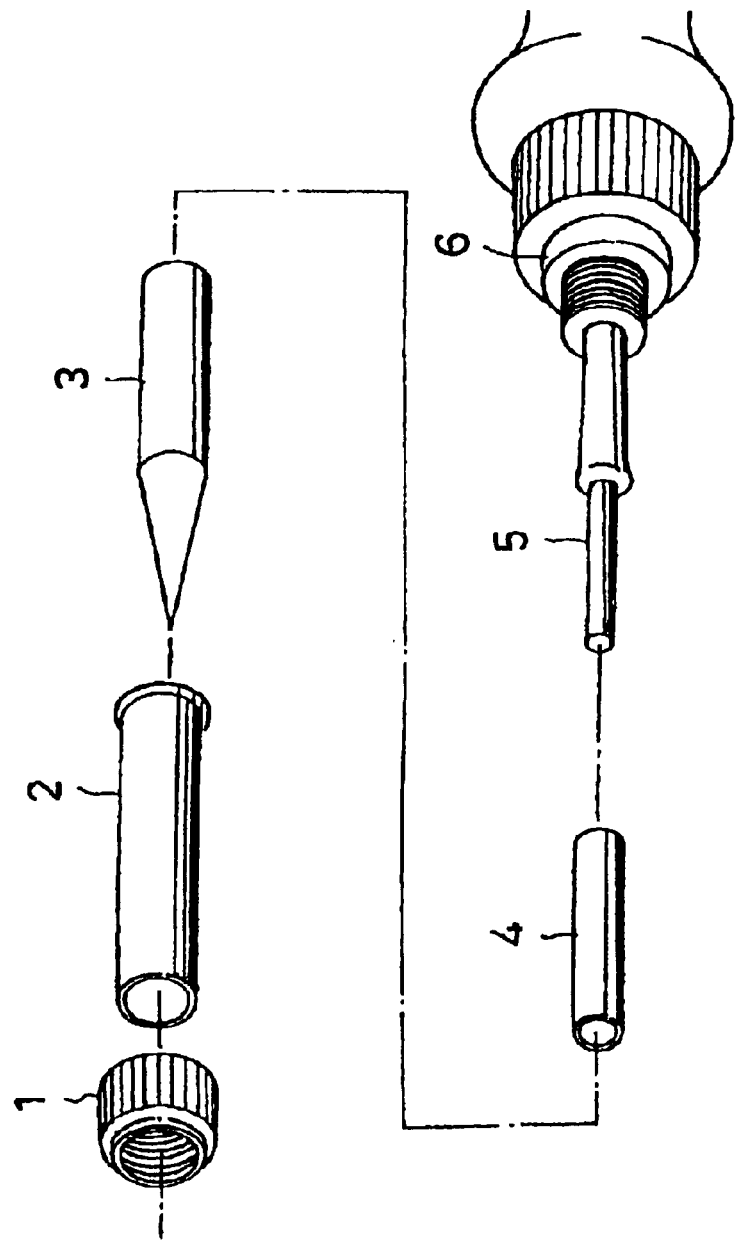
FIG. 1 is an exploded perspective view showing a structure of a conventional electric soldering iron.
Figure 2:
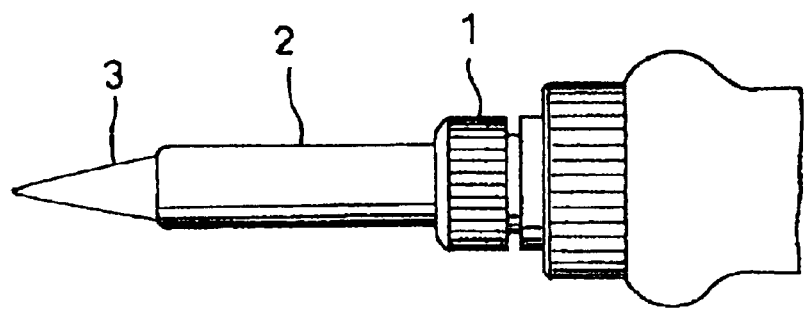
FIG. 2 shows an assembled state of the electric soldering iron in FIG. 1.
Figure 3:
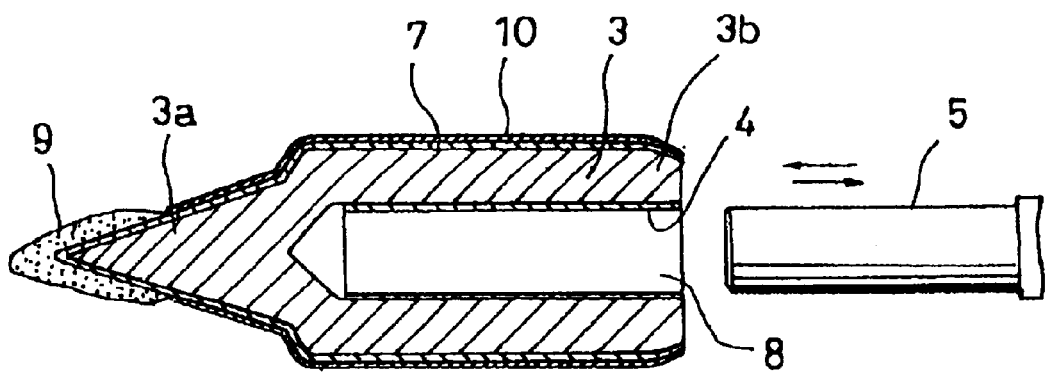
FIG. 3 is a sectional schematic view of an iron tip of a conventional soldering iron.

The iron tip for the electric soldering iron of the present invention is described in detail below. The same parts as those in the prior art in FIG. 1 to FIG. 3 are identified with the same reference numerals.

First Embodiment

Figure 5:
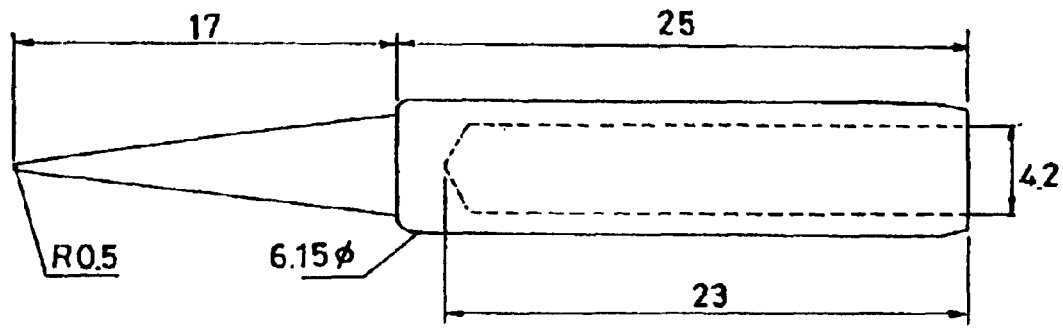
FIG. 5 shows the sectional shape and dimensions of an iron tip in each embodiment of the present invention.

The surface modifying method of the present invention is applied at the same portion as, and in replacement of, the conventional Cr plating of the soldering iron tip. It is also applied in the inside portion of the shell 8 in which the copper material of the copper-made soldering iron tip is exposed. Conventionally, this area is covered with the insert pipe 4. The iron tip 3 used in this embodiment is made of pure copper, and its shape and dimensions are shown in FIG. 5.

Figure 6:
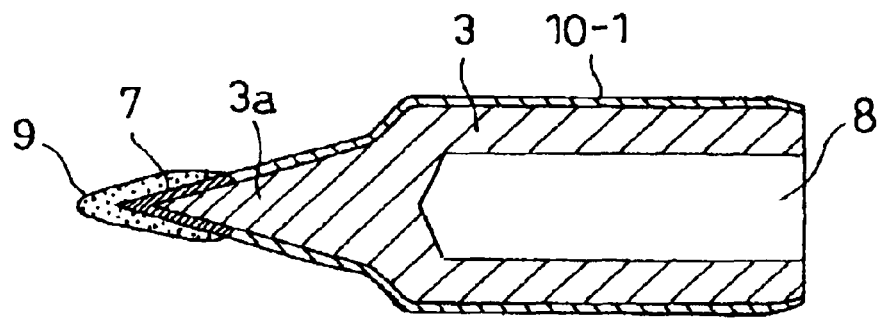
FIG. 6 is a sectional schematic view showing a first embodiment of an iron tip of the present invention, in which Fe plating is applied only in the leading end portion of the iron tip, and the remaining surface is modified according to the present invention.

First described below is the surface modification of the portion hitherto plated with Cr. FIG. 6 shows this embodiment, in which the leading end portion 3a of the iron tip 3 is locally plated with Fe. As mentioned above, the purpose of Fe plating 7 in this area is to prevent solder attack of the material of the iron tip 3, that is, copper or copper alloy, and it is not required at all to apply Fe plating 7 on the entire surface. From the viewpoint of working efficiency, however, it may be easier to apply Fe plating 7 on the entire surface, and this example will be described later in relation to a third embodiment.

In this embodiment, Fe plating 7 is applied only in the leading end portion 3a of the iron tip 3, and the remaining surface (the periphery of the iron tip excluding the leading end portion 3a) is coated with a mixture of 80% Al particles and 20% fluoride compound flux kneaded with a binder at a density of approximately 4 kg/cm$^2$ by means of a feather or similar brush, and is heated in nitrogen gas atmosphere at 700° C., and a surface modified layer 10-1 of approximately 40 $\mu$m in thickness is formed. This sample was installed in an electric soldering iron device shown in FIG. 1 and FIG. 2, and actually operated at 250 to 400° C. As a result, in a range of 24 hours, the surface was hardly oxidized, and no oxide scale was found, and an excellent resistance to oxidation was proved. The present invention was thus found to play the role of conventional Cr plating sufficiently, but when the entire surface is modified without applying Fe plating on the leading end portion 3a of the iron tip, the entire surface is covered with a stable oxide film of Al$_2$O$_3$, and solder cannot be applied by using an ordinary flux. So, this must be strictly avoided.

Second Embodiment

The surface modification of the inside of the shell 8 of the copper-made iron tip 3 is described herein. This area was not improved so far, because Cr plating for oxidation resistance was technically difficult. This embodiment will be described below.

The shape and dimensions are the same as in the preceding embodiment, except that the shell measures 4.2 mm in diameter and 23 mm in depth.

Figure 7:
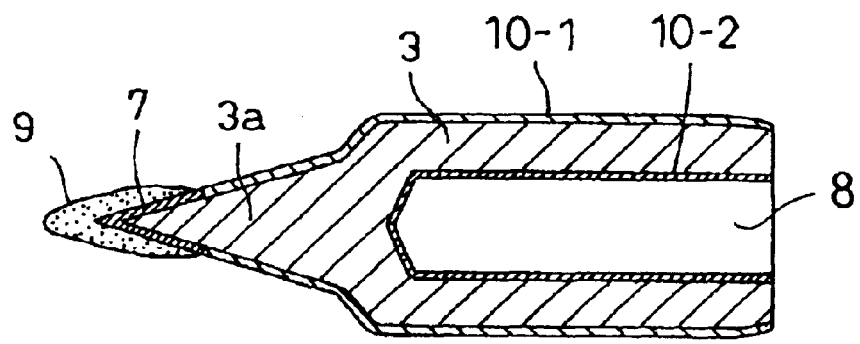
FIG. 7 is a sectional schematic view showing a second embodiment of an iron tip of the present invention, in which an inner surface of a shell of the iron tip incorporating a bar-shaped ceramic heater is modified according to the present invention.

FIG. 7 shows this embodiment, in which the portion 10-1 of the periphery of the iron tip 3 in the first embodiment is coated with a mixture of Al particles and fluoride compound flux by the same method as in the first embodiment, and further the inside of the shell 8 is uniformly coated, and heated in the same condition as in the first embodiment, and a surface modifying layer 10-2 is formed. After the treatment, to observe the inside state, the sample was cut in half and observed, and the same appearance as in the surface modifying layer 10-1 of the periphery was obtained.

Figure 8:
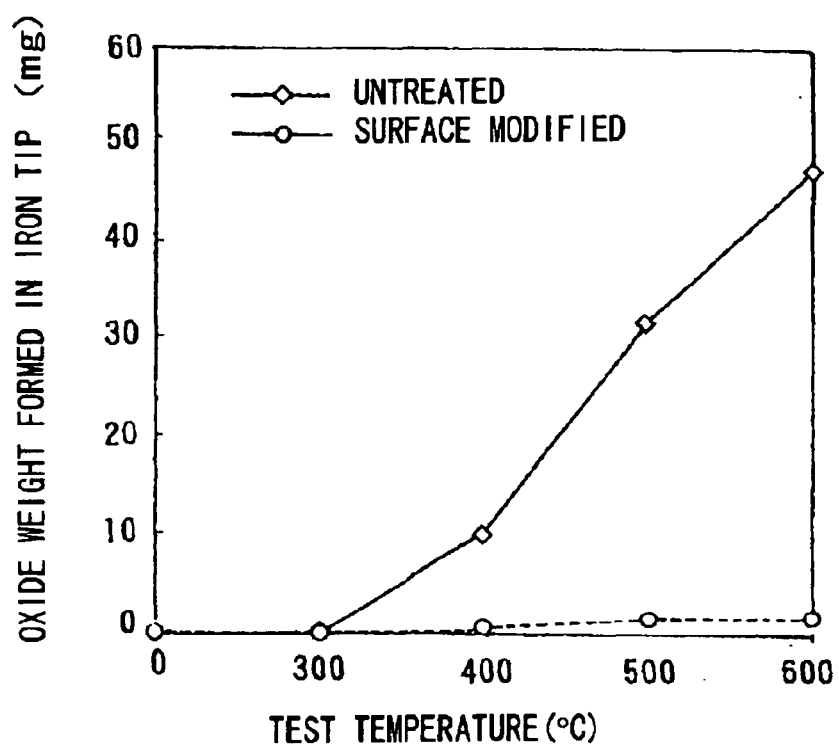
FIG. 8 is a graph showing comparison of oxidation increment between the surface modified iron tip of the second embodiment and an untreated iron tip after heating for 1 hr to 600° C. in the atmosphere.

To evaluate the oxidation resistance of the surface modifying layer, further, the following experiment was carried out: This method is to measure the same oxidation increment as in FIG. 4, and the iron tip fabricated in the second embodiment and untreated tip were heated for 1 hr in a furnace in the atmosphere of 300 to 600° C., and the oxidation resistance was compared based on the oxide increment. Results are shown in FIG. 8. Oxide increment per iron tip at test temperature is shown, and the surface modified iron tip was not increased in oxide at all up to 600° C., and an excellent oxidation resistance was proved. In actual soldering operation, the iron is used at lower than 400° C. and set not to exceed this temperature, but in the experiment, to shorten the test time, the temperature was raised to 600° C.

Third Embodiment

When the copper-made iron tip is used in untreated state, solder attack was significant, and the tip is worn in a very short time. Usually improvement is attempted by Fe plating, and in the first embodiment, only the leading end portion 3a is plated with Fe. In such partial plating of the leading end portion, however, the other portions must be protected from the solder bath by means of masking or the like, and the manufacturing process is complicated, and the product cost is increased, hence plating of the entire surface may be more advantageous.

Figure 9:
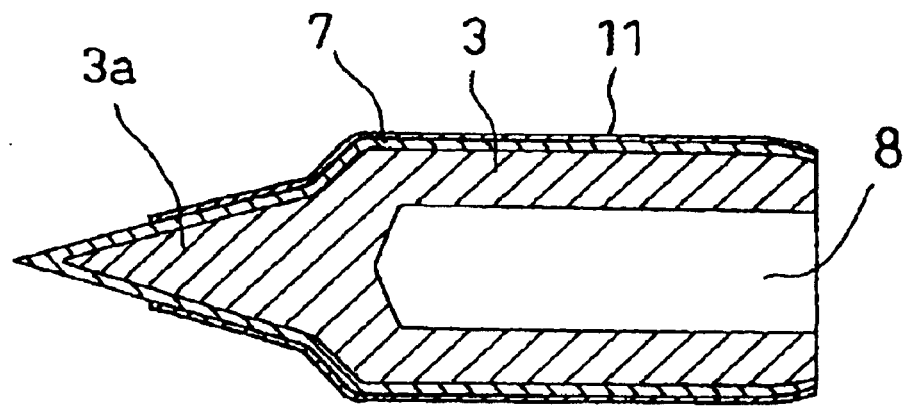
FIG. 9 is a sectional schematic view of a third embodiment of an iron tip of the present invention in the course of a manufacturing process, in which Fe plating is applied on the entire surface of the iron tip, and Cu plating is applied except for the leading end portion.
Figure 10:
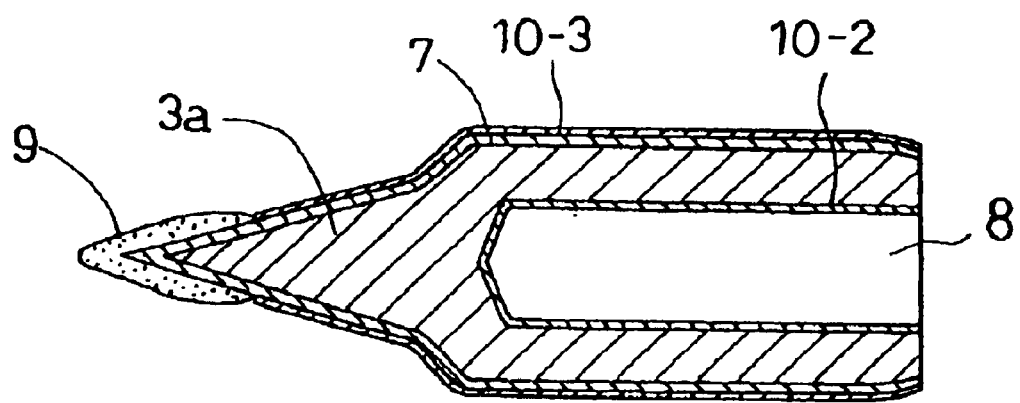
FIG. 10 is a schematic sectional view of a state after completion of manufacturing in the third embodiment of an iron tip of the present invention, in which the surface of the Cu plating layer in FIG. 9 is modified according to the present invention.

In this embodiment, therefore, the entire surface of the iron tip is plated with Fe. As shown in FIG. 9, in the first place, the entire surface is coated with Fe plating 7, and then Cu plating 11 is applied to the surface excluding the leading end portion 3a. Then, as shown in FIG. 10, the surface of Cu plating 11 is modified in the same manner as in the first embodiment.

As a result, the Cu plated layer 11 is alloyed with Al particles, and a surface modifying layer 10-3 of Cu—Al alloy is formed. This modifying layer was the same as the modified copper material in the first and second embodiments in properties and performance, and an excellent oxidation resistance was proved. However, if the Fe plated layer is directly treated without applying Cu plating 11, the Fe plated layer and Al particles react by heat treatment, and a brittle alloy layer is formed in the interface, which must be avoided. At this time, the thickness of Cu plating must be 10 $\mu$m or more, and if it is less than the specified thickness, an alloy layer similar to Fe plating is formed.

Fourth Embodiment

A soldering iron equipped with a surface modified iron tip in the first to third embodiments will be described. FIGS. 11A and 11B illustrate a schematic configuration of a soldering iron 30 of a fourth embodiment and constituent members in separate state. The shown soldering iron 30 is composed of a handle member 31, a heating member 32, a fixing member 33, and a replacement member 34, and the replacement member 34 is replaced with a new one in every specific number of times of use.

Figure 12A:
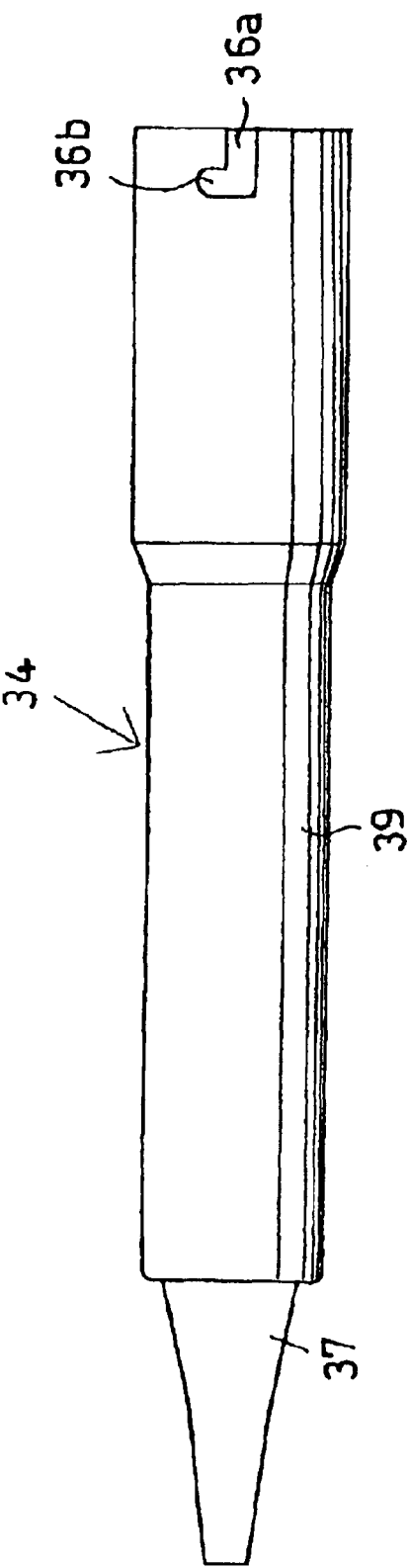
FIGS. 12A and 12B specifically illustrate a replacement member in FIG. 11.

To assemble the soldering iron 30, the heating member 32 is inserted into the handle member 31, and the fixing member 33 is screwed into the handle member 31, and the heating member 32 is fixed in the handle member 31. A columnar protrusion 35 provided at the leading end of the fixing member 33 is engaged with a notch groove 36 of the replacement member 34, and the replacement member 34 is fixed in the fixing member 33. As shown in FIG. 12A, the notch groove 36 is formed in an L-shape, including an axial groove 36a and a radial groove 36b, and the columnar protrusion 35 is guided into the axial groove 36a, the replacement member 34 is pushed into the fixing member 33, and the replacement member 34 is rotated, and the columnar protrusion 35 is held by the terminal end of the radial groove 36b.

Figure 12B:
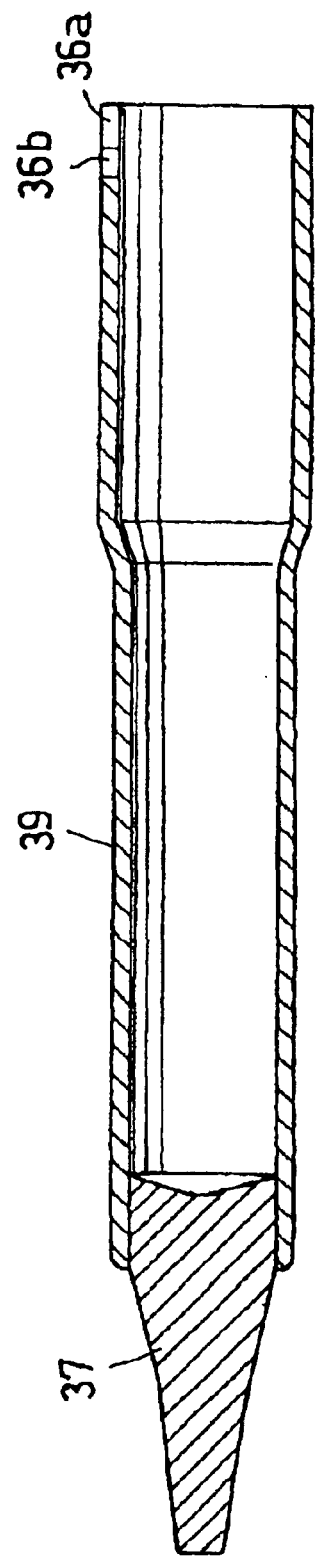

In this embodiment, the iron tip can be separated into a first member 37 and a second member 38, and they are respectively fixed to a leading end of the replacement member 34 and a leading end of the heating member 32 (FIG. 11B). FIGS. 12A and 12B specifically illustrate the replacement member 34, in which the replacement member 34 is integrally composed of a circular pipe member 39, and a copper-made first member 37 press-fitted to the leading end of the pipe member 39.

Figure 14B:
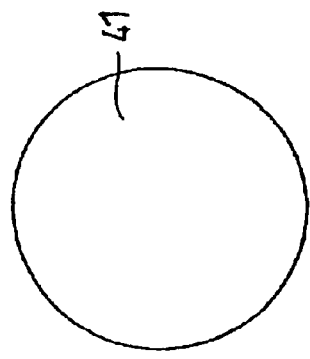
FIGS. 14A to 14D specifically illustrate a first member of the iron tip.
Figure 14D:
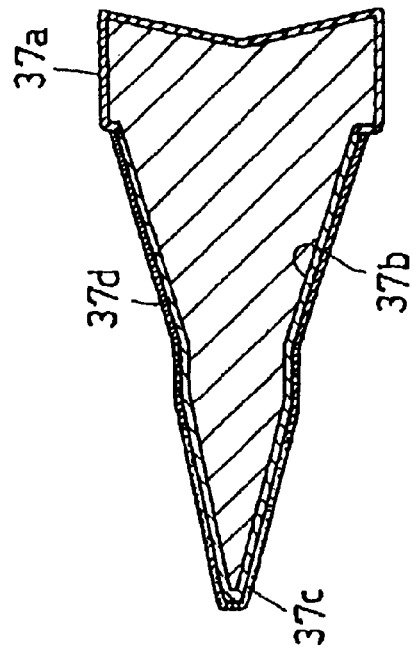
Figure 14A:
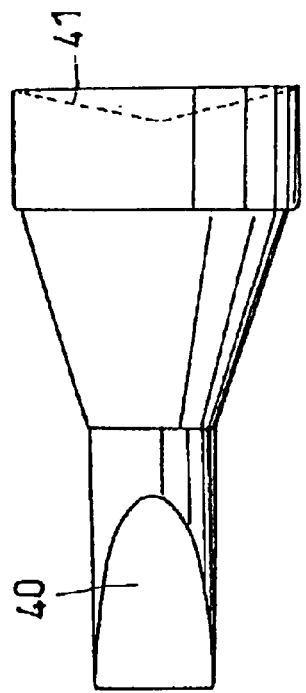
Figure 14C:
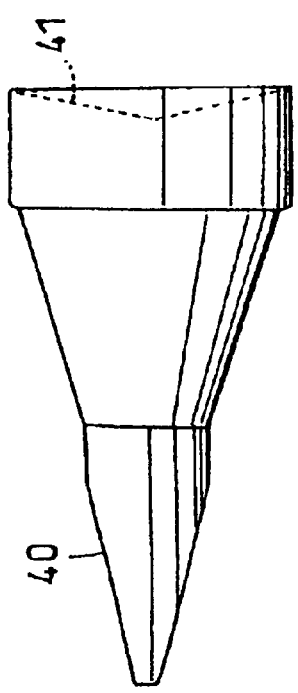

The first member 37 has a flat working surface 40 as shown in FIG. 14A, and is formed in a conical shape on the whole, and a shallow conically cut abutting portion 41 is formed at the rear end side as indicated by broken line. FIG. 14D is a sectional view of the first member 37, and the rear end side has a Cu—Al alloy modifying layer 37a formed including the abutting portion 41. The other part of the first member 37 is coated with an iron plated layer 37b, and its outside is covered with a chrome plated layer 37d except for a solder plated layer 37c at the leading end side.

As shown in FIG. 13A, the heating member 32 is composed of a copper-made second member 38 in a cylindrical shape with a bottom, a pipe member 42 fitted to the periphery of the base end of the second member 38, and a bar-shaped heater 43 inserted in the second member 38. The heater 43 is inserted from the rear end side of the second member 38, and the second member 38 and heater 43 are integrally formed by means of a ceramic adhesive excellent in electric insulation and heat conduction.

FIG. 13B is a sectional view of the second member 38. The second member 38 has a conical leading end portion 44 corresponding to the abutting portion 41 of the first member 37. On the periphery of the second member 38 including this leading end portion 44, a Cu—Al alloy modifying layer 38a is formed.

In the case of this soldering iron, the first member 37 and second member 38 are used in contact with each other, but since the abutting portions 41, 44 are modified into a surface with a Cu—Al alloy coating layer of high Al concentration, an excellent heat conduction is shown, and a satisfactory temperature control characteristic is realized. The abutting portions are not fused to stick to each other unlike gold plating or silver plating.

A typical technical example of separate type soldering iron is disclosed in Japanese Utility Model No. 6-46617 filed on Aug. 29, 1988, and PCT/EP97/00220 (WO97/26108) was proposed much later on Jan. 17, 1997. In either invention, however, the abutting portions are not particularly treated, and excellent heat conduction and temperature control characteristic as in the present invention are not realized.

Fifth Embodiment

Figure 15:
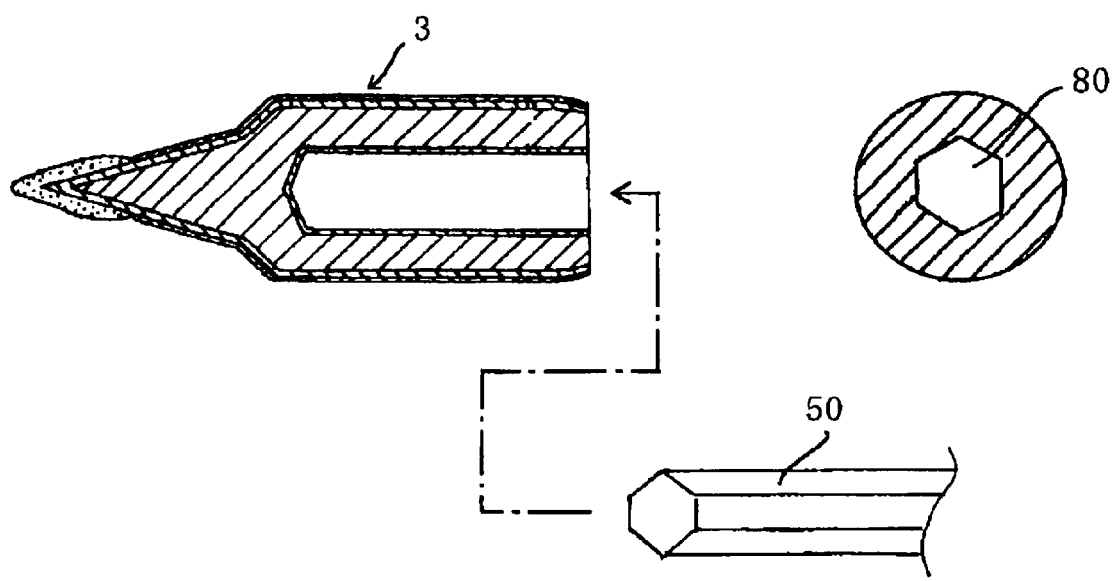
FIG. 15 is a view for describing a fifth embodiment.

FIG. 15 illustrates a modified example of the first to third embodiments. In this fifth embodiment, a hexagonal opening 80 is formed in the shell of the iron tip 3. Suited to the shape of the opening 80, a ceramic heater 50 is also hexagonal. In the case of the fifth embodiment, the ceramic heater has a square columnar shape, and as compared with the circular columnar shape, the contact area of the iron tip 3 and ceramic heater 50 is increased, and the heat conductivity is further enhanced.

As described specifically herein, according to the present invention, resistance to oxidation in high temperature environment is excellent, and heat conductivity is high, so that temperature control at high precision is realized.

What is claimed is:

1. An iron tip for an electric soldering iron, composed of copper or copper alloy, the iron tip comprising:
   a part or all of an outer surface excluding at least a leading end portion of the iron tip is modified into a surface with a Cu—Al alloy coating layer; and
   an outer surface excluding a solder coated portion in a leading end portion of the iron tip is plated with Cu in a film thickness range of approximately 10 to 50 $\mu$m; the surface is coated with a mixture of Al particles and flux; only the Al particles are melted in an inert gas atmosphere; and the surface is modified into a surface with a Cu—Al alloy coating layer having a high Al concentration.

2. The iron tip for an electric soldering iron according to claim 1, wherein
   a circular hole for incorporating a bar-shaped heater is opened at a base end side to form a shell; the inside of a hollow space of this shell is coated with a mixture of Al particles and flux; only the Al particles are melted in an inert gas atmosphere; and the inside surface is modified into a surface with a Cu—Al alloy coating layer having a high Al concentration.

3. The iron tip for an electric soldering iron according to claim 1, wherein
   a Cu—Al alloy coating layer having a high Al concentration is formed on a surface except for at least a soldering work area at a leading end side of the iron tip, and a rigid film of aluminum oxide $Al_2O_3$ is formed, thereby providing resistance to oxidation at high temperature.

4. The iron tip for an electric soldering iron according to claim 3, wherein
   a shell having a circular hole into which a bar-shaped heater is inserted is formed, opened at a base end side of the iron tip; an inside of the shell is modified into a surface with Cu—Al alloy coating layer having a high Al concentration; and a rigid film of aluminum oxide $Al_2O_3$ is formed, thereby providing resistance to oxidation at high temperature.

5. The iron tip for an electric soldering iron according to claim 4, wherein
   the soldering work area of the iron tip is plated with Fe on a base material surface of copper or copper alloy, and the Fe plated surface is coated with solder.

6. The iron tip for an electric soldering iron according to claim 5, wherein
   a bar-shaped heater is directly inserted and used without an insert pipe in the shell of the surface modified iron tip.

7. The iron tip for an electric soldering iron according to claim 1, comprising a first member and a second member separate from each other, wherein
   the first member and second member are used in contact with each other on abutting portions, and the abutting portions are modified into a surface with a Cu—Al alloy coating layer.

8. The iron tip according to claim 7, wherein
   the abutting portions are formed in a conical shape.

9. The iron tip according to claim 8, wherein
   the first member is fixed to a leading end of a cylindrical pipe member.

10. An electric soldering iron having an iron tip composed of copper or copper alloy, the electric soldering iron comprising:
    a part or all of an outer surface excluding a leading end portion of the iron tip is modified into a surface with a Cu—Al alloy coating layer; and
    an outer surface excluding a solder coating portion in a leading end portion of the iron tip is plated with Cu in a film thickness range of approximately 10 to 50 $\mu$m; the surface is coated with a mixture of Al particles and flux; only the Al particles are melted in an inert gas atmosphere; and the surface is modified into a surface with a Cu—Al alloy coating layer having high Al concentration.

11. The electric soldering iron according to claim 10, wherein
    a circular hole for incorporating a bar-shaped heater is opened at a base end side to form a shell; the inside of a hollow space of this shell is coated with a mixture of Al particles and flux; only the Al particles are melted in an inert gas atmosphere; and the inside surface is modified into a surface with a Cu—Al alloy coating layer having a high Al concentration.

12. The electric soldering iron according to claim 10, wherein
    a Cu—Al alloy coating layer having a high Al concentration is formed on a surface except for at least a soldering work area at a leading end side of the iron tip, and a rigid film of aluminum oxide $Al_2O_3$ is formed, thereby providing resistance to oxidation at high temperature.

13. The electric soldering iron according to claim 12, wherein
a shell having a circular hole into which a bar-shaped heater is inserted is formed, opened at a base end side of the iron tip; an inside of the shell is modified into a surface with a Cu—Al alloy coating layer having a high Al concentration; and a rigid film of aluminum oxide $Al_2O_3$ is formed, thereby providing resistance to oxidation at high temperature.

14. The electric soldering iron according to claim 13, wherein
the soldering work area of the iron tip is plated with Fe on a base material surface of copper or copper alloy, and the Fe plated surface is coated with solder.

15. The electric soldering iron according to claim 14, wherein
a bar-shaped heater is directly inserted and used without an insert pipe in the shell of the surface modified iron tip.

16. The electric soldering iron according to claim 10, wherein
the iron tip having a first member and a second member separate from each other, and
the first member and second member are used in contact with each other on abutting portions, and the abutting portions are modified into a surface with a Cu—Al alloy coating layer.

17. The electric soldering iron according to claim 16, wherein the abutting portions are formed in a conical shape.

18. The electric soldering iron according to claim 16, further comprising a handle member, a heating member, and a replacement member, wherein
the first member and second member are respectively fixed to a leading end of the replacement member and a leading end of the heating member.

19. The electric soldering iron according to claim 18, wherein
the replacement member is integrally formed of a cylindrical pipe member and the first member press-fitted into a leading end of the pipe member.

20. The electric soldering iron according to claim 19, wherein
the first member is formed in a conical shape on the whole, and a conically cut abutting portion is formed at a rear end side.

21. The electric soldering iron according to claim 18, wherein
the heating member is composed of a copper-made second member formed in a cylindrical shape with a bottom, a pipe member fitted to the periphery of base end side of the second member, and a bar-shaped heater inserted in the second member.

22. The iron tip for an electric soldering iron according to claim 10, wherein
the inside of a shell of an iron tip forming a square hole opened at the base end side are modified into a surface with a Cu—Al alloy coating layer high in Al concentration forming a rigid film of aluminum oxide $Al_2O_3$.

23. An iron lip for an electric soldering iron, the iron tip composed of copper or copper alloy, the iron tip comprising:
a part or all of an outer surface excluding at least a leading end portion of the iron tip is modified into a surface with a Cu—Al alloy coating layer; and a circular hole for incorporating a bar-shaped heater is opened at a base end side to form a shell; the inside of a hollow space of this shell is coated with a mixture of Al particles and flux; only the Al particles are melted in an inert gas atmosphere; and the inside surface is modified into a surface with a Cu—Al alloy coating layer having a high Al concentration.

24. An iron tip for an electric soldering iron, the iron tip composed of copper or copper alloy, the iron tip comprising:
a part or all of an outer surface excluding at least a leading end portion of the iron tip is modified into a surface with a Cu—Al alloy coating layer;
a Cu—Al alloy coating layer having a high Al concentration is formed on a surface except for at least a soldering work area at a leading end side of the iron tip, and a rigid film of aluminum oxide $Al_2O_3$ is formed, thereby providing resistance to oxidation at high temperature; and
a shell having a circular hole into which a bar-shaped heater is inserted is formed, opened at a base end side of the iron tip; an inside of the shell is modified into a surface with Cu—Al alloy coating layer having a high Al concentration; and a rigid film of aluminum oxide $Al_2O_3$ is formed, thereby providing resistance to oxidation at high temperature.

25. An iron tip for an electric soldering iron, the iron tip formed from copper or copper alloy, the iron tip comprising:
a leading end portion; and
a rearward portion having a surface with a Cu—Al alloy coating layer, the surface plated with Cu in a film thickness range of approximately 10 to 50 $\mu m$ and coated with a mixture of Al particles and flux with a high Al concentration.

26. The iron tip according to claim 25, including a first member and a second member separate from each other, wherein
the first member and second member are used in contact with each other on abutting portions, and the abutting portions are modified into a surface with a Cu—Al alloy coating layer.

27. The iron tip according to claim 26, wherein the abutting portions are formed in a conical shape.

28. The iron tip according to claim 27, wherein the first member is fixed to a leading end of a cylindrical pipe member.

29. An iron tip for an electric soldering iron, the iron tip formed from copper or copper alloy, the iron tip comprising:
a leading end portion; and
a rearward portion having a shell with an inner surface, the inner surface coated with a mixture of Al particles and flux, where the Al particles are melted in an inert gas atmosphere, whereby the inner surface is modified into a surface with a Cu—Al alloy coating layer having a high Al concentration.

30. An iron tip for an electric soldering iron, the iron tip formed from copper or copper alloy, the iron tip comprising:
a leading end portion; and
a rearward portion having a surface with a Cu—Al alloy coating layer, the Cu—Al alloy coating having a high Al concentration, and the surface having a rigid film of aluminum oxide $Al_2O_3$; and
the rearward portion having a shell adapted to receive a bar-shaped heater, the shell having an inner surface with Cu—Al alloy coating layer having a high Al concentration and a rigid film of aluminum oxide $Al_2O_3$.

31. The iron tip according to claim 30, wherein the soldering work area of the iron tip is plated with Fe on a base material surface of copper or copper alloy, and the Fe plated surface is coated with solder.

32. The iron tip for an electric soldering iron according to claim 31 wherein a bar-shaped heater is directly inserted and used without an insert pipe in the shell of the surface modified iron tip.

* * * * *